United States Patent
Nakade et al.

(10) Patent No.: US 10,030,597 B2
(45) Date of Patent: Jul. 24, 2018

(54) VEHICLE SPEED LIMIT APPARATUS

(71) Applicant: TOYOTA JIDOSHA KABUSHIKI KAISHA, Toyota-shi, Aichi-ken (JP)

(72) Inventors: Yusuke Nakade, Nagoya (JP); Yoshihide Nakane, Okazaki (JP); Kazuaki Sumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 389 days.

(21) Appl. No.: 15/070,415

(22) Filed: Mar. 15, 2016

(65) Prior Publication Data
US 2016/0281620 A1     Sep. 29, 2016

(30) Foreign Application Priority Data
Mar. 26, 2015  (JP) .................... 2015-065175

(51) Int. Cl.
*F02D 41/10*     (2006.01)
*F02D 29/02*     (2006.01)
*B60W 30/14*    (2006.01)
*B60K 31/00*     (2006.01)

(52) U.S. Cl.
CPC .......... *F02D 41/10* (2013.01); *B60W 30/146* (2013.01); *F02D 29/02* (2013.01); *B60K 2031/0091* (2013.01); *B60W 2520/10* (2013.01); *B60W 2520/105* (2013.01); *B60W 2520/28* (2013.01); *B60W 2540/10* (2013.01); *B60W 2720/10* (2013.01)

(58) Field of Classification Search
CPC ...... F02D 41/10; F02D 29/02; B60W 30/146; B60W 2520/10; B60W 2520/105; B60W 2520/28; B60W 2540/10; B60W 2720/10; B60K 2031/0091
See application file for complete search history.

(56) References Cited

U.S. PATENT DOCUMENTS 8,335,626 B2 * 12/2012 Fukuda ............... B60W 30/188
                                                       180/170
8,977,461 B2 * 3/2015 Matsushita ........... B60W 10/06
                                                       701/70
2011/0160978 A1  6/2011 Yuzawa et al.

FOREIGN PATENT DOCUMENTS

| JP | 2010-077960 A | 4/2010 |
| JP | 2013-100787 A | 5/2013 |
| JP | 2016-078677 A | 5/2016 |
| WO | 2016/059753 A1 | 4/2016 |

* cited by examiner

*Primary Examiner* — Thomas G Black
*Assistant Examiner* — Sze-Hon Kong
(74) *Attorney, Agent, or Firm* — Oliff PLC

(57) ABSTRACT

A vehicle speed limit apparatus includes a processor configured to calculate a demand value, calculate a pre-correction upper limit value based on a limit acceleration, correct the pre-correction upper limit value based on a first accumulated value to calculate a first upper limit value, correct the pre-correction upper limit value based on a maximum drive force of a drive force generation apparatus and the current acceleration to calculate a second upper limit value, select the smaller of the demand value and the second upper limit value when the first upper limit value exceeds a predetermined threshold corresponding to the maximum drive force, and select the smaller of the demand value and the first upper limit value when the first upper limit value does not exceed the predetermined threshold, and control the drive force generation apparatus to generate the drive force corresponding to the selected value.

4 Claims, 9 Drawing Sheets

10,030,597 B2

VEHICLE SPEED LIMIT APPARATUS

CROSS REFERENCE TO RELATED APPLICATION

The present application is based on and claims the benefit of priority of Japanese Priority Application No. 2015-065175, filed on Mar. 26, 2015, the entire contents of which are hereby incorporated by reference.

FIELD

The disclosure is related to a vehicle speed limit apparatus.

BACKGROUND

Japanese Laid-open Patent Publication No. 2010-077960 discloses a technique for controlling an electronic throttle valve by selecting, when a driver demand drive force (i.e., a drive force demanded by the driver and calculated based on an accelerator opening degree) is greater than a target drive force for limiting vehicle speed, the smaller of these two, that is to say, the target drive force for limiting vehicle speed, so that actual vehicle speed does not exceed a limit vehicle speed.

Here, a configuration is assumed in which an acceleration for limiting vehicle speed (referred to as "vehicle speed limit acceleration", hereinafter) is calculated based on a difference between actual vehicle speed and limit vehicle speed, a target drive force for limiting vehicle speed (referred to as "vehicle speed limit drive force", hereinafter) is calculated based on the vehicle speed limit acceleration, a driver demand drive force is calculated based on an accelerator opening degree, and a drive force is controlled based on the smaller of the vehicle speed limit drive force and the driver demand drive force. In other words, when the driver demand drive force is greater than the vehicle speed limit drive force, the drive force is limited to the vehicle speed limit drive force.

Here, a state in which the vehicle speed limit drive force is smaller than the driver demand drive force and thus the drive force is controlled based on the vehicle speed limit drive force is referred to as "a limit state", and a state in which the vehicle speed limit drive force is greater than the driver demand drive force and thus the drive force is controlled based on the driver demand drive force is referred to as "a non-limit state". The vehicle speed limit drive force is calculated based on the vehicle speed limit acceleration; however, in order to reduce a probability that the actual vehicle speed exceeds the limit vehicle speed, it is necessary to correct the vehicle speed limit drive force based on a traveling circumstance. Because the drive force is controlled based on the vehicle speed limit drive force in the limit state, the vehicle speed limit drive force can be corrected based on an accumulated value obtained by accumulating a difference between an actual acceleration and the vehicle speed limit acceleration in cycles. However, constantly performing such a correction in the limit state leads to the following problem. For example, at an uphill road, there is a case where the vehicle speed limit drive force becomes greater than a maximum drive force that can be generated by a drive force generation apparatus. In such a case, the actual acceleration does not follow the vehicle speed limit acceleration, which causes the difference between the actual acceleration and the limit acceleration to become greater. The accumulation of such a difference in cycles causes the vehicle speed limit drive force to be corrected excessively. After a transition from the uphill road to a flat road, the vehicle speed limit drive force, which has been corrected excessively during the traveling on the uphill road, does not work, which may cause the actual vehicle speed to exceed the limit vehicle speed.

Therefore, it is an object of one aspect of the disclosure to provide a vehicle speed limit apparatus that can reduce a probability of an actual vehicle speed exceeding a limit vehicle speed after a transition from an uphill road to a flat road.

SUMMARY

According to an aspect of the disclosure, a vehicle speed limit apparatus is provided, which includes:

a demand value calculation part configured to calculate a demand value according to an accelerator opening degree, the demand value being related to a drive force;

an upper limit value calculation part configured to calculate a pre-correction upper limit value based on a limit acceleration, the limit acceleration being determined according to a vehicle speed difference between a limit vehicle speed and a current vehicle speed;

a first upper limit value correction part configured to correct the pre-correction upper limit value based on a first accumulated value to calculate a first upper limit value, the first accumulated value being obtained by accumulating an acceleration difference between the limit acceleration and a current acceleration in cycles;

a second upper limit value correction part configured to correct the pre-correction upper limit value based on a maximum drive force of a drive force generation apparatus and the current acceleration to calculate a second upper limit value;

a selection part configured to (i) select the smaller of the demand value and the second upper limit value when the first upper limit value exceeds a predetermined threshold corresponding to the maximum drive force, and (ii) select the smaller of the demand value and the first upper limit value when the first upper limit value does not exceed the predetermined threshold; and a control part configured to control the drive force generation apparatus to generate the drive force corresponding to the selected value selected by the selection part.

DESCRIPTION OF EMBODIMENTS

In the following, embodiments will be described in detail by referring to the accompanying drawings.

Figure 1:
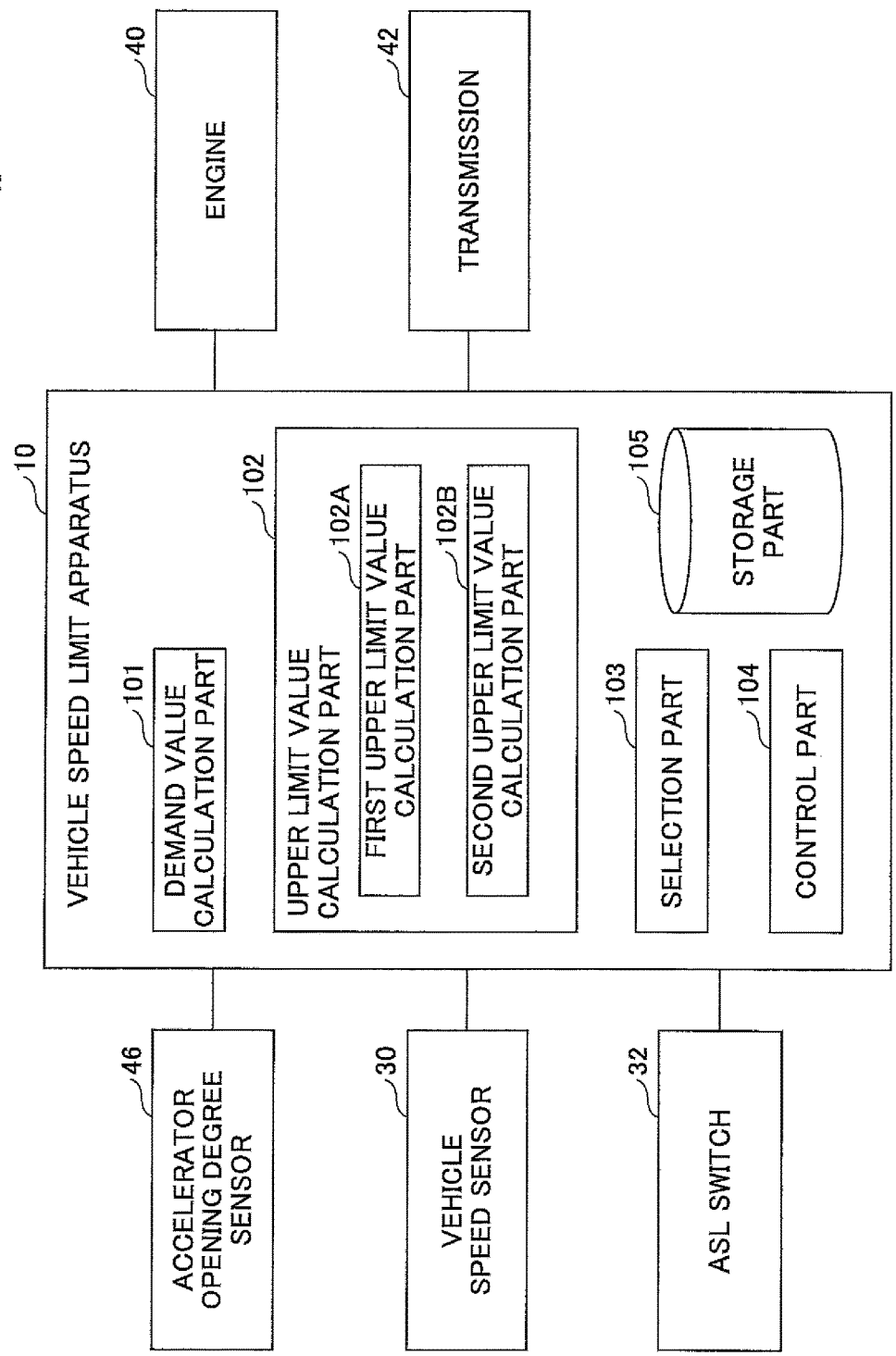
FIG. 1 is a diagram illustrating an example of a vehicle control system including a vehicle speed limit apparatus according to an embodiment.

FIG. 1 is a diagram illustrating an example of a vehicle control system 1 including a vehicle speed limit apparatus 10 according to an embodiment.

The vehicle control system 1 includes the vehicle speed limit apparatus 10. The vehicle speed limit apparatus 10 includes an ECU (Electronic Control Unit), which can be implemented as a micro-computer having a CPU, ROM and RAM.

The vehicle speed limit apparatus 10 includes an ASL (Adjustable Speed Limiter) function.

The vehicle speed limit apparatus 10 is coupled to a vehicle speed sensor 30 that detects vehicle speed, an ASL switch 32, and an accelerator opening degree sensor 46 that detects an accelerator opening degree (i.e., an accelerator operation amount). The vehicle speed sensor 30 includes vehicle wheel speed sensors that are respectively provided in a plurality of wheels. In this case, the vehicle speed is calculated based on an average value of the detection values of the vehicle wheel speed sensors, for example.

The vehicle speed limit apparatus 10 includes a demand value calculation part 101, an upper limit value calculation part 102, a selection part 103, a control part 104, and a storage part (memory) 105.

The demand value calculation part 101 calculates a demand value according to the accelerator opening degree from the accelerator opening degree sensor 46. For example, the demand value calculation part 101 calculates the demand value related to the drive force based on the accelerator opening degree and the vehicle speed. The demand value related to the drive force may be a demand value for the drive force itself, or a demand value related to acceleration, throttle opening degree, drive torque, etc. In the following, as an example, the demand value related to the drive force is a demand value for the drive force itself, and is referred to as "a driver demand drive force".

The upper limit value calculation part 102 calculates the upper limit value related to the drive force based on a limit vehicle speed. The limit vehicle speed is a fixed value. Alternatively, the limit vehicle speed is set by the driver. Alternatively, the limit vehicle speed is automatically set as is the case with ISA (Intelligent Speed Assistance). For example, the limit vehicle speed is set automatically based on limit speed information which can be obtained by communication with an external facility (including a central server) such as an infrastructure and represents the limit speed with respect to the road on which the vehicle is currently traveling. Further, for example, the limit vehicle speed is set automatically based on limit speed information of a road sign which may be image-recognized using a vehicle-installed camera or the like.

The upper limit value related to the drive force may be an upper limit value for the drive force itself, or an upper limit value related to the acceleration, the throttle opening degree, the drive torque, etc., as is the case with the demand value for the drive force. In the following, as an example, the upper limit value related to the drive force is an upper limit value for the drive force itself, and is referred to as "an upper limit drive force". A further function of the upper limit value calculation part 102 is described hereinafter.

The selection part 103 selects the smaller of the driver demand drive force calculated by the demand value calculation part 101 and the upper limit drive force calculated by the upper limit value calculation part 102. For example, the selection part 103 selects the upper limit drive force if the driver demand drive force is greater than or equal to the upper limit drive force, or otherwise selects the driver demand drive force. In the following, the drive force selected by the selection part 103 is referred to as "a target drive force". Further, in the following, a state in which the driver demand drive force is selected by the selection part 103 is referred to as "a non-limit state", and a state in which the upper limit drive force is selected by the selection part 103 is referred to as "a limit state".

The control part 104 controls an engine 40 and a transmission 42 (a combination thereof is an example of a drive force generation apparatus) such that the drive force according to the drive force (i.e., the target drive force) selected by the selection part 103 is generated. For example, the control part 104 determines a target torque of the engine 40 and a target transmission gear ratio of the transmission 42 such that the target drive force is generated, and controls the engine 40 and the transmission 42 such that the target torque and the target transmission gear ratio are implemented.

Figure 3:
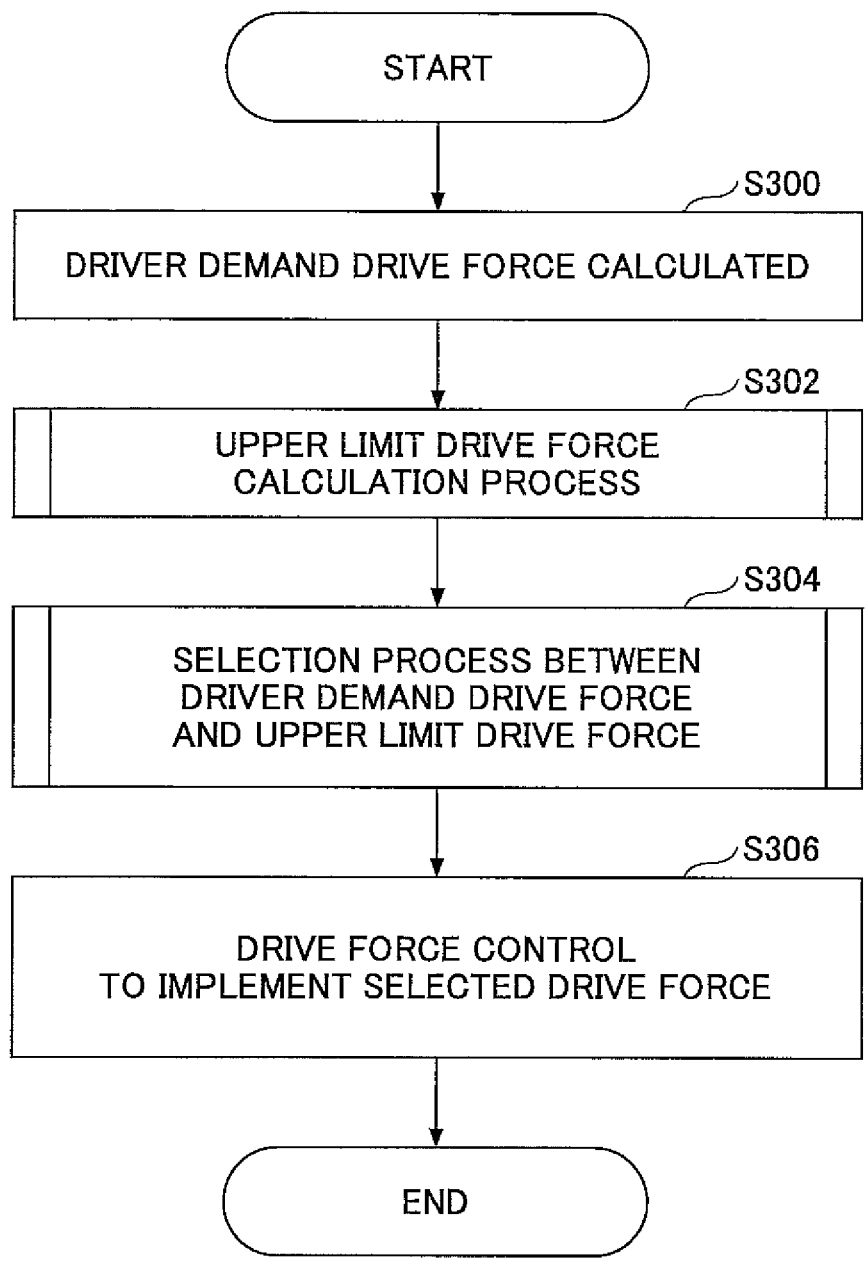
FIG. 3 is a flowchart illustrating an example of a process executed by the vehicle speed limit apparatus.

It is noted that the demand value calculation part 101, the upper limit value calculation part 102, the selection part 103 and the control part 104 operate in a synchronized manner in a cycle (see FIG. 3). Specifically, at a certain cycle, the demand value calculation part 101 and the upper limit value calculation part 102 calculate the driver demand drive force and the upper limit drive force, respectively, the selection part 103 selects the smaller of those two drive forces, and the control part 104 controls the engine 40 and the transmission 42 based on the selected drive force (i.e., the target drive force).

The storage part 105 stores information (information about vehicle weight, and mapped data, etc.) that is to be used for processes of the demand value calculation part 101, etc.

Figure 2:
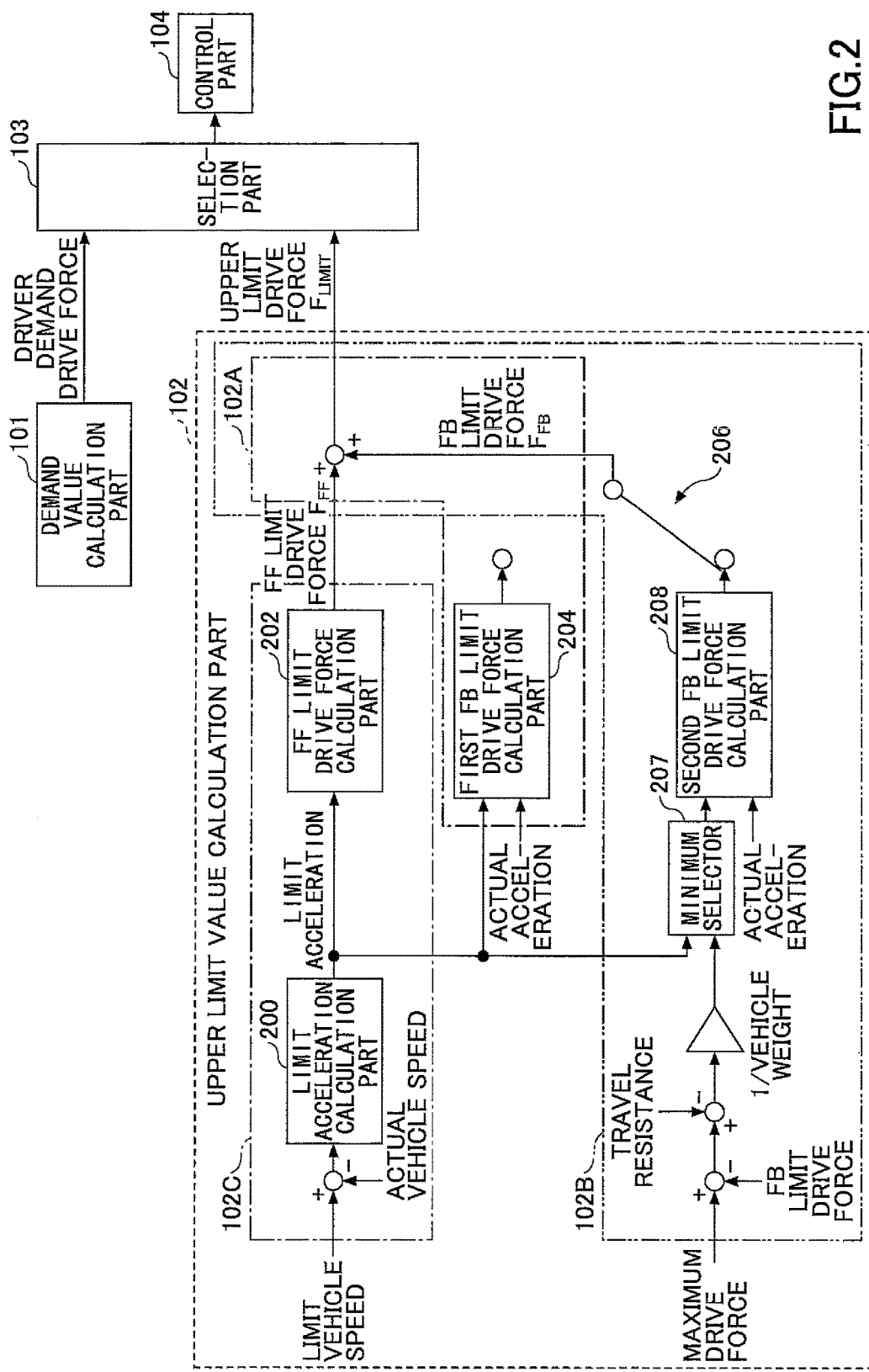
FIG. 2 is a functional block diagram of an upper limit value calculation part.

FIG. 2 is a functional block diagram of the upper limit value calculation part 102. It is noted that in FIG. 2 the demand value calculation part 101, the selection part 103, and the control part 104 are also illustrated.

The upper limit value calculation part 102 includes a limit acceleration calculation part 200, a FF limit drive force calculation part 202, a first FB limit drive force calculation part 204, a minimum selector 207, and a second FE limit drive force calculation part 208.

The upper limit value calculation part 102 uses the limit vehicle speed, an actual vehicle speed, an actual acceleration, a travel resistance, a vehicle weight, a maximum drive force and a current drive force. The limit vehicle speed is as described above. The actual vehicle speed (the current actual vehicle speed) is based on the output of the vehicle speed sensor 30. The actual acceleration (the current actual acceleration) is based on a differential value of the output of the vehicle speed sensor 30. The travel resistance is calculated according to the actual vehicle speed, for example. The travel resistance includes a rolling resistance and an air resistance. Mapped data that represents a relationship between the travel resistance and the vehicle speed is stored in the storage part 105. The current drive force is based on the drive force selected by the selection part 103 (the target drive force used by the control part 104, for example). However, the current drive force may be based on an estimated value of a current output of the engine 40. The estimated value may be derived from an injection amount and an intake air flow, for example. The vehicle weight is based on a designed value and stored in the storage part 105. The maximum drive force corresponds to a maximum value of the drive force that can be generated by the drive force generation apparatus. The maximum drive force is stored in the storage part 105.

The upper limit value calculation part 102 calculates the upper limit drive force based on these input parameters (the limit vehicle speed, the actual vehicle speed, etc.) to output the calculated upper limit drive force to the selection part 103. The upper limit drive force $F_{LIMIT}$ is calculated with the following formula, as illustrated in FIG. 2.

Upper limit drive force $F_{LIMIT}$=limit drive force $F_{FF}$+ FB limit drive force $F_{FB}$       formula (1)

The limit drive force $F_{FF}$ (an example of a pre-correction upper limit value) is referred to as "a FF limit drive force $F_{FF}$", and the limit drive force $F_{EB}$ is referred to as "a FB limit drive force $F_{EB}$" for the sake of distinction between the limit drive force $F_{FF}$ and the limit drive force $F_{EB}$.

The FF limit drive force $F_{FF}$ is calculated as follows. At first, the limit acceleration calculation part 200 calculates the limit acceleration based on a difference between the limit vehicle speed and the actual vehicle speed. In this example, the difference between the limit vehicle speed and the actual vehicle speed is derived by subtracting the actual vehicle speed from the limit vehicle speed. The limit acceleration corresponds to a permissible maximum acceleration (i.e., a maximum acceleration permissible in terms of the limit vehicle speed) according to the current actual vehicle speed. Basically, the limit acceleration is calculated such that the limit acceleration becomes greater as the difference between the limit vehicle speed and the actual vehicle speed becomes greater. Next, the FF limit drive force calculation part 202 calculates the FF limit drive force $F_{FF}$ based on the limit acceleration. The FF limit drive force $F_{FF}$ is calculated by adding the travel resistance to a product of the limit acceleration and the vehicle weight, for example.

The FB limit drive force $F_{FB}$ is calculated with a selected one of three following ways. In other words, there are three ways of calculating the FB limit drive force $F_{EB}$. In FIG. 2, a part related to only two ways of the three ways is illustrated. The third calculation process is described hereinafter with reference to FIG. 4.

According to the first calculation way, as illustrated in FIG. 2, the first FB limit drive force calculation part 204 calculates the FB limit drive force $F_{FB}$ based on the difference between the limit acceleration and the actual acceleration. Specifically, the difference, which is obtained by subtracting the actual acceleration from the limit acceleration, is multiplied by a predetermined gain. Then, the value thus obtained (current value) is added to the previous value (i.e., the values are accumulated over cycles). Then, the accumulated value is multiplied by the vehicle weight to calculate the FB limit drive force $F_{FB}$. It is noted that an item of multiplying the vehicle weight may be omitted by incorporating the vehicle weight into the predetermined gain. In the following, the FB limit drive force $F_{FB}$ thus calculated with the first calculation way is referred to as "a first FB limit drive force $F_{FB}$", and the upper limit drive force $F_{LIMIT}$ (an example of a first upper limit value) calculated based on the first FB limit drive force $F_{FB}$ is referred to as "a first upper limit drive force $F_{LIMIT}$".

According to the second calculation way, as illustrated in FIG. 2, the FB limit drive force $F_{FB}$ (an example of a correction value) is calculated based on the actual acceleration and the maximum acceleration. Specifically, as illustrated in FIG. 2, in the minimum selector 207 the smaller of the maximum acceleration and the limit acceleration is selected. Then, in the second FB limit drive force calculation part 208, the difference, which is obtained by subtracting the actual acceleration from the selected acceleration, is multiplied by a predetermined gain. Then, in the second FE limit drive force calculation part 208, the value thus obtained (current value) is added to the previous value (i.e., the values are accumulated over cycles). Then, in the second FB limit drive force calculation part 208, the accumulated value is multiplied by the vehicle weight to calculate the FE limit drive force $F_{FB}$. For example, a case where the maximum acceleration is selected in the minimum selector 207 is as follows. Ga is a gain.

FB limit drive force $F_{FB}$=(vehicle weight)× ∫{(maximum acceleration)− (actual acceleration)}×Ga       formula (2)

In the formula (2), the item ∫{(maximum acceleration)− (actual acceleration)} means the accumulation (integration) over cycles. It is noted that, in the formula (2), the item of multiplying the vehicle weight (the first item on the right side) may be omitted by incorporating the vehicle weight into the predetermined gain. In the following, the FB limit drive force $F_{FB}$ thus calculated with the second calculation way is referred to as "a second FB limit drive force $F_{FB}$", and the upper limit drive force $F_{LIMIT}$ (an example of a second upper limit value) calculated based on the second FB limit drive force $F_{FB}$ is referred to as "a second upper limit drive force $F_{LIMIT}$".

The maximum acceleration is calculated from the maximum drive force of the vehicle. For example, the maximum acceleration is calculated by subtracting the travel resistance from a drive force difference, which is obtained by subtracting the FB limit drive force $F_{FB}$ from the maximum drive force, and dividing the thus obtained value by the vehicle weight. Specifically, the FB limit drive force $F_{FB}$ is calculated as follows.

Maximum acceleration={(maximum drive force)− (FB limit drive force $F_{FB}$)−(travel resistance)}/ (vehicle weight)       formula (3)

The FB limit drive force $F_{FB}$ in the formula (3) is the one that is used to calculate the upper limit drive force $F_{LIMIT}$. In other words, the FB limit drive force $F_{FB}$ in the formula (3) is the one that was selected by a switch 206. At that time, the FB limit drive force $F_{FB}$ used in the formula (3) is the one that was calculated at the previous cycle, as is the case with the current drive force. As is apparent from the formula (3), the maximum acceleration is determined under a current travel situation (the travel resistance, the road gradient, etc.).

It is noted that the current drive force may be used as the maximum drive force in the formula (3). This is because, as described hereinafter, the second FB limit drive force $F_{FB}$ is used when the first upper limit drive force $F_{LIMIT}$ exceeds the maximum drive force of the vehicle in the limit state, and thus the current drive force is substantially equal to the maximum drive force when the second FB limit drive force $F_{FB}$ is used.

The first FB limit drive force $F_{FB}$ is used at the current cycle when the first upper limit drive force $F_{LIMIT}$ based on the first FB limit drive force $F_{FB}$ is less than or equal to the maximum drive force of the vehicle. On the other hand, the second FB limit drive force $F_{FB}$ is used at the current cycle when the first upper limit drive force $F_{LIMIT}$ exceeds the maximum drive force of the vehicle. The selection between these two FB limit drive forces $F_{FB}$ is schematically illustrated with the switch 206 in FIG. 2. It is noted that the function (selection function) of the switch 206 may be implemented equivalently after these two FB limit drive forces $F_{FB}$ have been separately added to the FF limit drive force $F_{FF}$, respectively. In this case, the function of the switch 206 may be incorporated in the selection part 103.

According to the configuration illustrated in FIG. 2, when the first upper limit drive force $F_{LIMIT}$ is less than or equal to the maximum drive force of the vehicle, the first upper limit drive force $F_{LIMIT}$ is input to the selection part 103. On the other hand, when the first upper limit drive force $F_{LIMIT}$ exceeds the maximum drive force of the vehicle, the second upper limit drive force $F_{LIMIT}$ is input to the selection part 103. Thus, according to the configuration illustrated in FIG. 2, when the first upper limit drive force $F_{LIMIT}$ exceeds the maximum drive force of the vehicle, the second upper limit drive force $F_{LIMIT}$ is used, which can reduce a probability that the upper limit drive force $F_{LIMIT}$ does not work after the transition from the uphill road to the flat road and causes the actual vehicle speed to exceed the limit vehicle speed. The details of the effect are described below.

It is noted that, in the example illustrated in FIG. 2, a block 102C including the limit acceleration calculation part 200 and the FF limit drive force calculation part 202 is an example of an upper limit value calculation part. A block 102A including the first FB limit drive force calculation part 204 is an example of a first upper limit value correction part. A block 102B including the minimum selector 207 and the second FB limit drive force calculation part 208 is an example of second upper limit value correction part. In the example illustrated in FIG. 2, the correction of the upper limit drive force $F_{LIMIT}$ is implemented by adding the FB limit drive force $F_{FB}$ calculated in the first FB limit drive force calculation part 204 or the second FB limit drive force calculation part 208 to the FF limit drive force $F_{FF}$.

Figure 4:
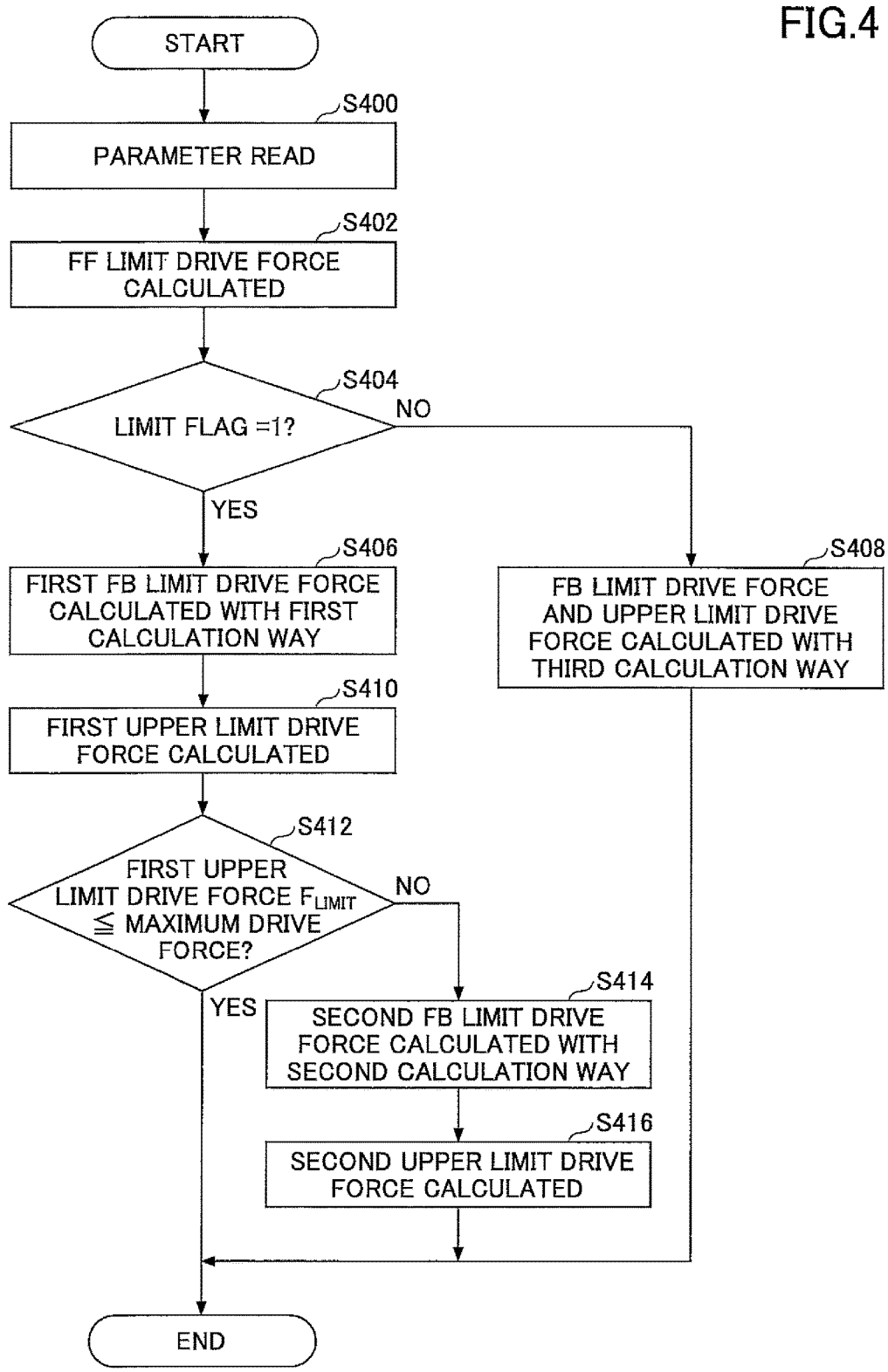
FIG. 4 is a flowchart illustrating an example of an upper limit value calculation process.
Figure 5:
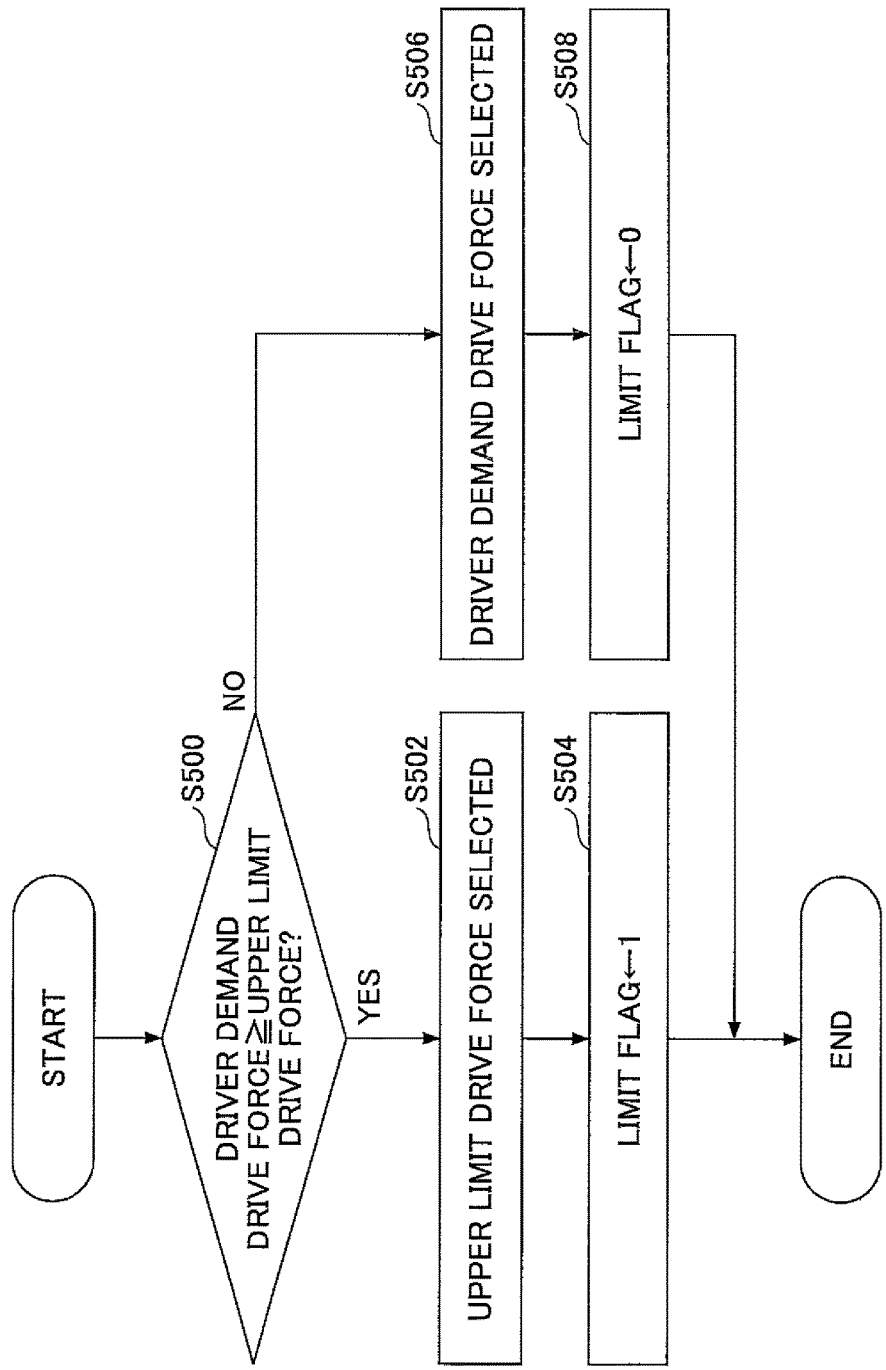
FIG. 5 is a flowchart illustrating an example of a selection process.

Next, with reference to FIG. 3 through FIG. 5, an operation of the vehicle speed limit apparatus 10 is described.

FIG. 3 is an example of a flowchart of a process executed by the vehicle speed limit apparatus 10. The process illustrated in FIG. 3 may be performed at a predetermined cycle during the ON state of the ASL function, for example. It is noted that the ASL function is basically in its ON state when the ASL switch 32 is in its ON state.

In step S300, the demand value calculation part 101 reads the accelerator opening degree and the vehicle speed, and calculates the driver demand drive force based on the read accelerator opening degree and the read vehicle speed.

In step S302, the upper limit value calculation part 102 performs an upper limit drive force calculation process. The upper limit drive force calculation process is described hereinafter with reference to FIG. 4.

In step S304, the selection part 103 performs a selection process for selecting the smaller of the driver demand drive force obtained in step S300 and the upper limit drive force $F_{LIMIT}$ obtained in step S302. The selection process is described hereinafter with reference to FIG. 5.

In step S306, the control part 104 controls the engine 40 and the transmission 42 such that the drive force corresponding to the drive force (i.e. the target drive force) selected in step S304 is generated.

FIG. 4 is a flowchart illustrating an example of the upper limit value calculation process.

In step S400, the upper limit value calculation part 102 reads the limit vehicle speed, the actual vehicle speed, the actual acceleration, the travel resistance, the vehicle weight, the maximum drive force, and the current drive force. It is noted that the vehicle weight and the maximum drive force, among these parameters, are fixed values, and thus the vehicle weight and the maximum drive force may be incorporated in a calculation formula as a constant.

In step S402, the upper limit value calculation part 102 calculates the FF limit drive force $F_{FF}$ based on the parameters read in step S400. The calculation way of the FF limit drive force $F_{FF}$ is as described above.

In step S404, the upper limit value calculation part 102 determines whether a limit flag is "1". The limit flag being "0" is indicative of the non-limit state, and the limit flag being "1" is indicative of the limit state. If the determination result is "YES", the process goes to step S406, and if the determination result is "NO", the process goes to step S408.

In step S406, the upper limit value calculation part 102 calculates the FB limit drive force $F_{FB}$ (i.e., the first FB limit drive force $F_{FB}$) with the first calculation way based on the parameters read in step S400. The first calculation way is as described above. It is noted that the first FB limit drive force calculation part 204 may start to operate when the limit flag becomes "1", using 0 as the previous value at an initial cycle.

In step S408, the upper limit value calculation part 102 calculates the FB limit drive force $F_{FB}$ with the third calculation way based on the parameters read in step S400. According to the third calculation way, the FB limit drive force $F_{FB}$ is calculated based on the actual acceleration and the current drive force. Specifically, the actual acceleration is multiplied by the vehicle weight. Then, the value thus obtained is added to the travel resistance. Then, the value thus obtained is subtracted from the current drive force to calculate the FB limit drive force $F_{FB}$. Specifically, the FB limit drive force $F_{FB}$ is calculated as follows.

FB limit drive force $F_{FB}$=(current drive force)−
{(vehicle weight)×(actual acceleration)+
(travel resistance)}     formula (4)

Further, in step S408, the upper limit value calculation part 102 calculates the upper limit drive force $F_{LIMIT}$ based on the FB limit drive force $F_{FB}$ calculated with the third calculation way. The calculation way of the upper limit drive force $F_{LIMIT}$ is as described above.

In step S410, the upper limit value calculation part 102 calculates, based on the FF limit drive force $F_{FF}$ calculated in step S402 and the first FE limit drive force $F_{FB}$ calculated in step S406, the first upper limit drive force $F_{LIMIT}$. The calculation way of the first upper limit drive force $F_{LIMIT}$ is as described above.

In step S412, the upper limit value calculation part 102 determines whether the first upper limit drive force $F_{LIMIT}$ calculated in step S410 is less than or equal to the maximum drive force of the vehicle. If the determination result is "YES", the process at the current cycle ends (as a result of this, the first upper limit drive force $F_{LIMIT}$ is output), and if the determination result is "NO", the process goes to step S414.

In step S414, the upper limit value calculation part 102 calculates the FB limit drive force $F_{FB}$ (i.e., the second FB limit drive force $F_{FB}$) with the second calculation way based on the parameters read in step S400. The second calculation way is as described above. It is noted that the second FB limit drive force calculation part 208 may start to operate when the first upper limit drive force $F_{LIMIT}$ exceeds the maximum drive force, using 0 as the previous value at an initial cycle.

In step S416, the upper limit value calculation part 102 calculates, based on the FF limit drive force $F_{FF}$ calculated in step S402 and the second FB limit drive force $F_{FB}$ calculated in step S414, the second upper limit drive force $F_{LIMIT}$. The calculation way of the second upper limit drive force $F_{LIMIT}$ is as described above.

According to the process illustrated in FIG. 4, in the limit state, the first upper limit drive force $F_{LIMIT}$ is output as the upper limit drive force $F_{LIMIT}$, when the first upper limit drive force $F_{LIMIT}$ is less than or equal to the maximum drive force of the vehicle, while the second upper limit drive force $F_{LIMIT}$ is output as the upper limit drive force $F_{LIMIT}$, when the first upper limit drive force $F_{LIMIT}$ exceeds the maximum drive force of the vehicle.

FIG. 5 is a flowchart illustrating an example of the selection process.

In step S500, the selection part 103 determines whether the driver demand drive force is greater than or equal to the upper limit drive force $F_{LIMIT}$ output by the process illustrated in FIG. 4. If the determination result is "YES", the process goes to step S502, and if the determination result is "NO", the process goes to step S506.

In step S502, the selection part 103 selects the upper limit drive force $F_{LIMIT}$.

In step S504, the selection part 103 sets the limit flag to "1".

In step S506, the selection part 103 selects the driver demand drive force.

In step S508, the selection part 103 sets the limit flag to "0".

According to the process illustrated in FIG. 5, when the upper limit drive force $F_{LIMIT}$ is selected, the limit flag is set to "1", and when the driver demand drive force is selected, the limit flag is set to "0".

Figure 6:
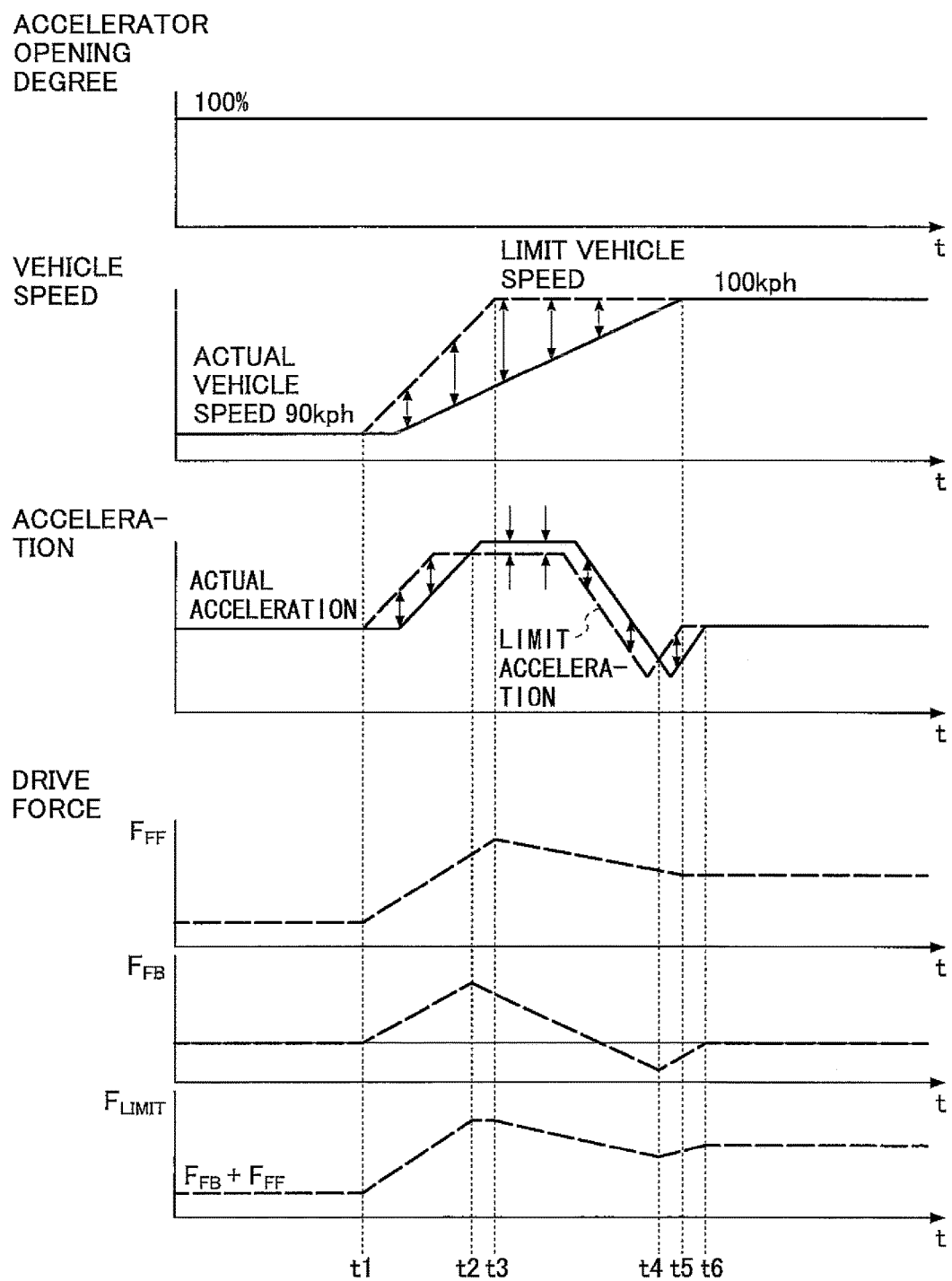
FIG. 6 is a diagram describing a way of calculating a first upper limit drive force $F_{LIMIT}$ based on a first FB limit drive force $F_{FB}$.

Next, with reference to FIG. 6, the technical significance of the first calculation way of the FE limit drive force $F_{FB}$ is described. The first calculation way of the FE limit drive force $F_{FB}$ is adopted in a state where the first upper limit drive force $F_{LIMIT}$ is less than or equal to the maximum drive force of the vehicle, as described above.

FIG. 6 is a diagram describing a way of calculating the first upper limit drive force $F_{LIMIT}$ based on a first FB limit drive force $F_{FB}$. In FIG. 6, from the upper side thereof, the time series of the accelerator opening degree, the time series of the vehicle speed, the time series of the acceleration, and the time series of the respective drive forces (i.e., the FF limit drive force $F_{FF}$, the first FB limit drive force $F_{FB}$, and the first upper limit drive force $F_{LIMIT}$) are illustrated as an example. With respect to the time series of the vehicle speed, the time series of the actual vehicle speed and the time series of the limit vehicle speed are illustrated with a solid line and a dotted line, respectively. With respect to the time series of the acceleration, the time series of the actual acceleration and the time series of the limit acceleration are illustrated with a solid line and a dotted line, respectively.

In the example illustrated in FIG. 6, before time t1, the accelerator opening degree is 100%, the limit vehicle speed is 90 km/h, and the actual vehicle speed is substantially 90 km/h. In the example illustrated in FIG. 6, at time t1, an instruction is generated such that the limit vehicle speed is changed from 90 km/h to 100 km/h while the accelerator opening degree is kept at 100%. As a result of this, the limit vehicle speed is gradually increased to reach 100 km/h at time t3. Accordingly, the difference between the limit vehicle speed and the actual vehicle speed becomes substantially greater than 0 (see an arrow in up and down direction in FIG. 6), and the FF limit drive force $F_{FF}$ increases according to the difference between the limit vehicle speed and the actual vehicle speed, compared to the FF limit drive force $F_{FF}$ before time t1.

Further, the limit acceleration is substantially greater than the actual acceleration from time t1 to time t2, which causes the first FB limit drive force $F_{FB}$ to increase from time t1 to time t2. On the other hand, the limit acceleration is substantially smaller than the actual acceleration from time t2 to time t4, which causes the first FB limit drive force $F_{FB}$ to decrease from time t2 to time t4. Further, the limit acceleration is substantially greater than the actual acceleration from time t4 to time t6, which causes the first FE limit drive force $F_{FB}$ to increase from time t4 to time t6. As a result of this, the first upper limit drive force $F_{LIMIT}$ gradually increases from time t1 to time t2, gradually decreases until time 4 after time 3, and then increases until time 6, as illustrated in FIG. 6. As a result of this, the difference between the limit vehicle speed and the actual vehicle speed becomes substantially 0 at time t6.

In this way, according to the calculation way of the first upper limit drive force $F_{LIMIT}$ based on the first calculation way of the first FB limit drive force $F_{FB}$, the FF limit drive force $F_{FF}$ and the first FB limit drive force $F_{FB}$ are calculated such that the difference between the limit vehicle speed and the actual vehicle speed becomes 0 when the difference between the limit vehicle speed and the actual vehicle speed becomes substantially greater than 0.

Figure 7:
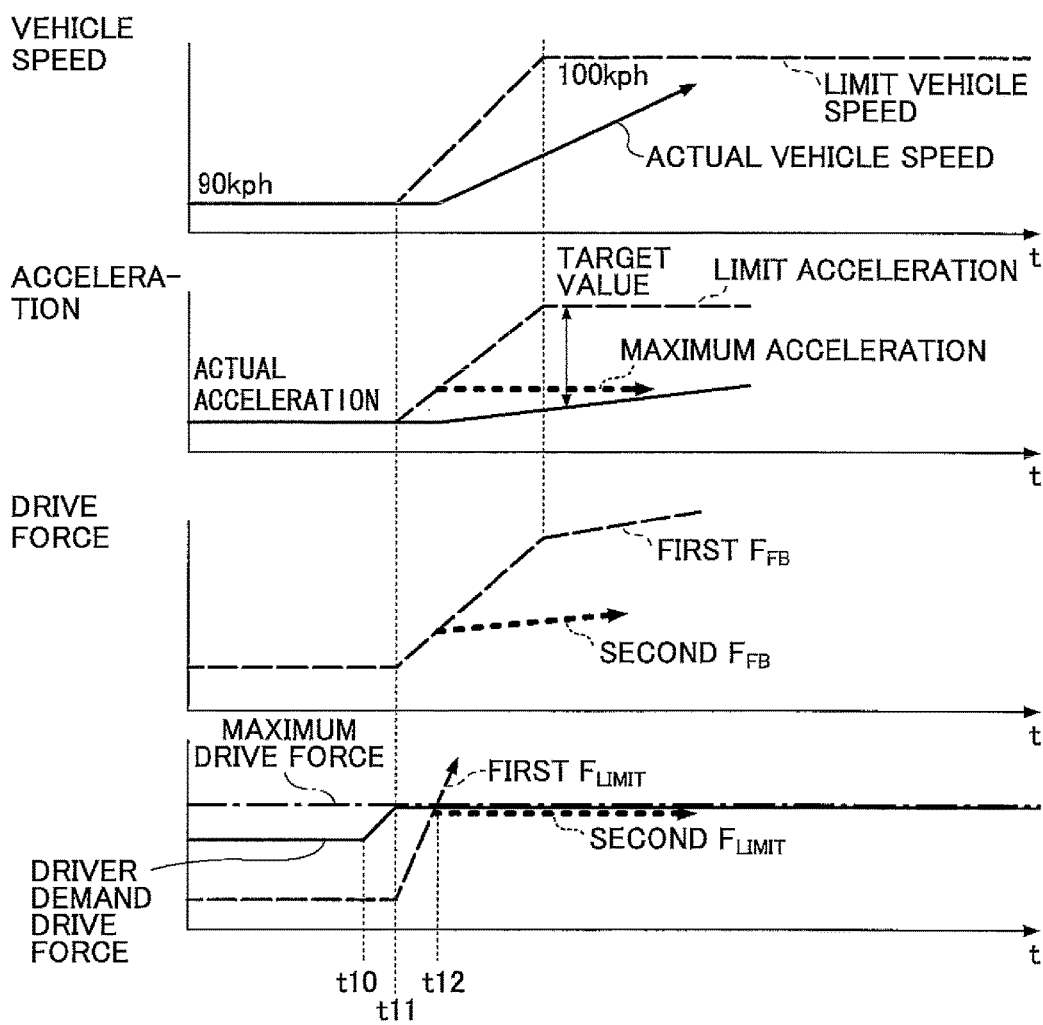
FIG. 7 is a diagram illustrating a situation where switching from the first upper limit drive force $F_{LIMIT}$ to a second upper limit drive force $F_{LIMIT}$ occurs.

FIG. 7 is a diagram illustrating a situation where switching from the first upper limit drive force $F_{LIMIT}$ to the second upper limit drive force $F_{LIMIT}$ occurs. In FIG. 7, from the upper side thereof, the time series of the vehicle speed, the time series of the acceleration, the time series of the FB limit drive forces $F_{FB}$ (i.e., the first and second FB limit drive forces $F_{FB}$), and the time series of the upper limit drive forces (i.e., the first and second upper limit drive force $F_{LIMIT}$) and the driver demand drive force are illustrated as an example. With respect to the time series of the vehicle speed, the time series of the actual vehicle speed and the time series of the limit vehicle speed are illustrated with a solid line and a dotted line, respectively, With respect to the time series of the acceleration, the time series of the actual acceleration and the time series of the limit acceleration are illustrated with a solid line and a dotted line, respectively, and the time series of the maximum acceleration is also illustrated. Further, with respect to the time series of the upper limit drive forces and the driver demand drive force, the time series of the maximum drive force is also illustrated.

In the example illustrated in FIG. 7, it is assumed that the limit state has been formed before time t10. Before time t10, the road is flat, the accelerator opening degree is 80%, the limit vehicle speed is 90 km/h, and the actual vehicle speed is substantially 90 km/h. In the example illustrated in FIG. 7, the road becomes uphill at time t10, and the accelerator opening degree increases to 100% (and thus the driver demand drive force increases). The actual acceleration does not follow the limit acceleration in the limit state because of the uphill road, and thus, at time t11, an instruction is generated such that the limit vehicle speed is changed from 90 km/h to 100 km/h while the accelerator opening degree is kept at 100%. Since the vehicle still travels on the uphill road, the acceleration difference between the actual acceleration and the limit acceleration is great, which causes the first FB limit drive force $F_{FB}$ and thus the first upper limit drive force $F_{LIMIT}$ to increase correspondingly. At time t12, the first upper limit drive force $F_{LIMIT}$ exceeds the limit drive force. As a result of this, at time t12, the switching from the first upper limit drive force $F_{LIMIT}$ to the second upper limit drive force $F_{LIMIT}$ is implemented. It is noted that, in the example illustrated in FIG. 7, at time t12, the second upper limit drive force $F_{LIMIT}$ becomes equal to the driver demand drive force, but the limit state is kept (see FIG. 5).

Figure 8:
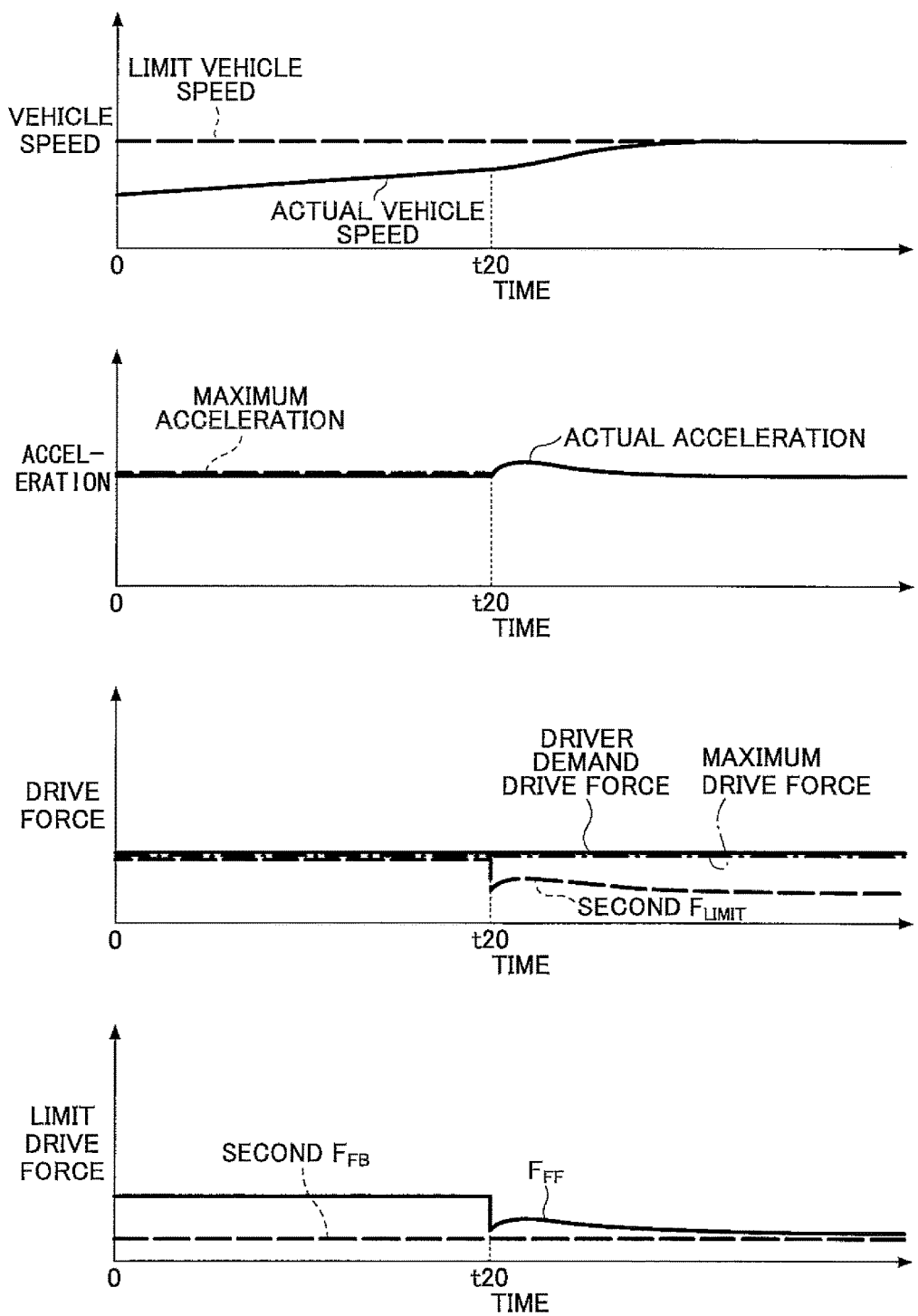
FIG. 8 is a diagram describing a case where switching from the first upper limit drive force $F_{LIMIT}$ to the second upper limit drive force $F_{LIMIT}$ occurs during traveling on an uphill road.
Figure 9:
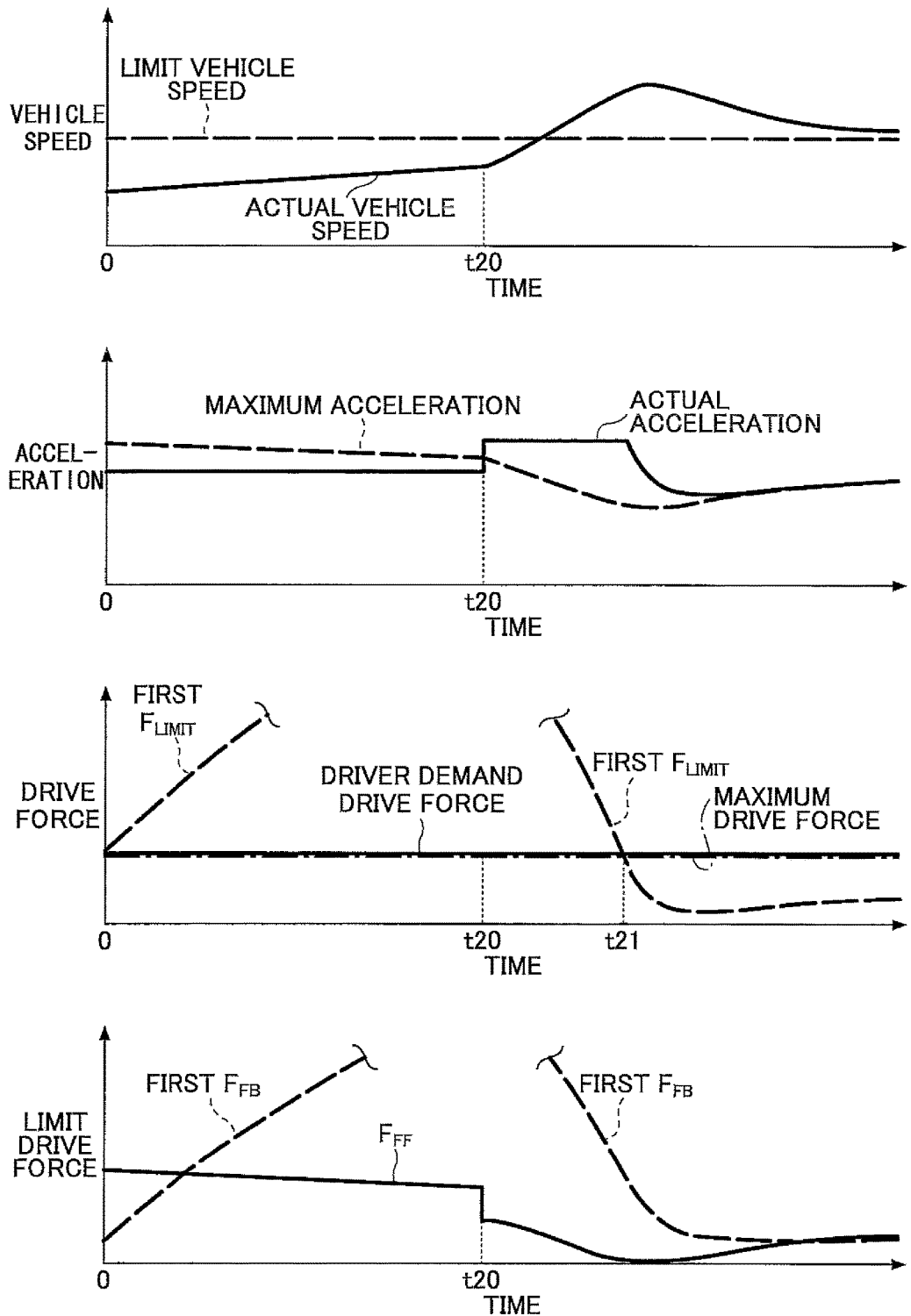
FIG. 9 is a diagram describing a comparative example.

Next, with reference to FIG. 8 and FIG. 9, the technical significance of the switching from the first upper limit drive force $F_{LIMIT}$ to the second upper limit drive force $F_{LIMIT}$ is described.

FIG. 8 is a diagram describing a case where switching from the first upper limit drive force $F_{LIMIT}$ to the second upper limit drive force $F_{LIMIT}$ occurs during traveling on the uphill road. In FIG. 8, from the upper side thereof, the time series of the vehicle speed, the time series of the acceleration, the time series of the limit drive forces (the first FF limit drive force $F_{FF}$ and the second FB limit drive force $F_{FB}$) and the maximum drive force, and the time series of the limit drive forces (i.e., the FF limit drive force $F_{FF}$ and the second FB limit drive force $F_{FB}$) are illustrated as an example. With respect to the time series of the vehicle speed, the time series of the actual vehicle speed and the time series of the limit vehicle speed are illustrated with a solid line and a dotted line, respectively. With respect to the time series of the acceleration, the time series of the actual acceleration and the time series of the maximum acceleration are illustrated with a solid line and a dotted line, respectively. With respect to the time series of the drive force, the time series of the driver demand drive force and the time series of the second upper limit drive force $F_{LIMIT}$ are illustrated with a solid line and a dotted line, respectively. With respect to the time series of the limit drive force, the time series of the FF limit drive force $F_{FF}$ and the time series of the second FB limit drive force $F_{FB}$ are illustrated with a solid line and a dotted line, respectively.

FIG. 9 is a diagram illustrating the time series of the same parameters according to a comparative example. However, in the example illustrated in FIG. 9, with respect to the time series of the acceleration, the time series of the actual acceleration and the time series of the limit acceleration are illustrated with a solid line and a dotted line, respectively. Further, with respect to the time series of the drive force, the time series of the driver demand drive force and the time series of the first upper limit drive force $F_{LIMIT}$ are illustrated. With respect to the time series of the limit drive force, the time series of the FF limit drive force $F_{FF}$ and the time series of the first FB limit drive force $F_{FB}$ are illustrated with a solid line and a dotted line, respectively. According to the configuration of the comparative embodiment, the switching from the first upper limit drive force $F_{LIMIT}$ to the second upper limit drive force $F_{LIMIT}$ is not implemented during traveling on the uphill road. In other word, according to the comparative embodiment, the first upper limit drive force $F_{LIMIT}$ is constantly used, and thus the second upper limit drive force $F_{LIMIT}$ is not used.

In the examples illustrated in FIG. 8 and FIG. 9, it is assumed that the accelerator opening degree is kept at 100% from time 0. Further, at time t20, the transition from the uphill road to the flat road occurs. For example, it is assumed that the road gradient is changed from 5% to 0% at time t20.

According to the comparative example, as described above with reference to FIG. 7, when the vehicle travels on the uphill road, the actual acceleration does not follow the limit acceleration, which causes the acceleration difference between the actual acceleration and the limit acceleration to be greater, as illustrated in FIG. 9. Thus, the accumulation of such a great acceleration difference in cycles causes the first feedback and thus the first upper limit drive force $F_{LIMIT}$ to be greater. As a result of this, at time t20 when the uphill road ends to be a flat road, the first upper limit drive force $F_{LIMIT}$ is substantially greater than the driver demand drive force (and the maximum drive force), which causes a state (non-limit state), in which a relatively great driver demand drive force (corresponding to the maximum drive force, in the example illustrated in FIG. 9) is permitted, to be continued for a relatively long time (until time t21 in the example illustrated in FIG. 9). As a result of this, as illustrated in FIG. 9, the actual vehicle speed exceeds the limit vehicle speed at time t21 after time t20.

In contrast, according to the embodiment, the FB limit drive force $F_{FB}$ does not substantially increase at the hill road, and thus the second upper limit drive force $F_{LIMIT}$ does not substantially increase, as illustrated in FIG. 8. This is because the second FB limit drive force $F_{FB}$ is calculated based on not the acceleration difference between the actual acceleration and the limit acceleration but the difference between the smaller of the limit acceleration and the maximum acceleration and the actual acceleration (the maximum acceleration is used under the situation such as an uphill road in which the limit acceleration becomes greater than the maximum acceleration). At time t20 when the uphill road ends to be a flat road, the second upper limit drive force $F_{LIMIT}$ does not become substantially greater than the driver demand drive force (and the maximum drive force) such that the second upper limit drive force $F_{LIMIT}$ is substantially equal to the maximum drive force, as illustrated in FIG. 8. Thus, the limit state can be formed based on the second upper limit drive force $F_{LIMIT}$, which is less than or equal to the maximum drive force, immediately after time t20. As a result of this, as illustrated in FIG. 8, the probability that the actual vehicle speed exceeds the limit vehicle speed after time t20 is reduced.

Further, according to the embodiment, the second upper limit drive force $F_{LIMIT}$ is calculated based on the acceleration difference between the smaller of the maximum acceleration and the limit acceleration and the actual acceleration, as described above. With this arrangement, it becomes possible to reduce a constant difference (steady-state error) between the actual vehicle speed and the limit vehicle speed, compared to a configuration in which the second upper limit drive force $F_{LIMIT}$ is calculated constantly based on the acceleration difference between the maximum acceleration and the actual acceleration. This is because the maximum acceleration is not based on the actual vehicle speed, as described above. For example, in the example illustrated in FIG. 8, after time t20, a reduction in the limit acceleration may cause the change from a state in which the second upper limit drive force $F_{LIMIT}$ is calculated based on the acceleration difference between the maximum acceleration and the actual acceleration to a state in which the second upper limit drive force $F_{LIMIT}$ is calculated based on the acceleration difference between the limit acceleration and the actual acceleration.

The present invention is disclosed with reference to the preferred embodiments. However, it should be understood that the present invention is not limited to the above-described embodiments, and variations and modifications may be made without departing from the scope of the present invention.

For example, according to the embodiments, the minimum selector 207 is provided to reduce the steady-state error; however, the minimum selector 207 may be omitted. In such a case, the second FB limit drive force calculation part 208 calculates the second FB limit drive force $F_{FB}$ constantly based on the acceleration difference between the maximum acceleration and the actual acceleration.

Further, according to the embodiments described above, a combination of the engine 40 and the transmission 42 is used as an example of a drive force generation apparatus; however, this is not indispensable. The drive force generation apparatus may be a combination of an electric motor and the transmission, or a combination of the engine, the electric motor, and the transmission (including a reduction gear with a planetary gear train).

Further, according to the embodiments described above, as an example, the demand value related to the drive force is the demand value for the drive force itself (i.e., the driver demand drive force), and the upper limit value related to the drive force is the upper limit value for the drive force itself (i.e., the upper limit drive force). However, the demand value related to the drive force may be a demand value for the acceleration, the throttle opening degree, the drive torque, etc., as described above. For example, the demand value related to the drive force is a demand value for the acceleration (i.e., a driver demand acceleration), and the upper limit value related to the drive force is the upper limit value for the acceleration (i.e., an upper limit acceleration). In this case, the drive forces such as the driver demand drive force and the upper limit drive force may be divided by the vehicle weight to be handled in the dimension of acceleration.

Further, according to the embodiments described above, the maximum value of the driver demand drive force is set to be equal to the maximum drive force; however, the maximum value of the driver demand drive force may be greater than the maximum drive force. In this case, when the driver demand drive force exceeds the maximum drive force in the non-limit state, the drive force corresponding to the limit drive force is generated.

What is claimed is:

1. A vehicle speed limit apparatus, comprising a processor configured to:
    calculate a demand value according to an accelerator opening degree, the demand value being related to a drive force;
    calculate a pre-correction upper limit value based on a limit acceleration, the limit acceleration being determined according to a vehicle speed difference between a limit vehicle speed and a current vehicle speed;
    correct the pre-correction upper limit value based on a first accumulated value to calculate a first upper limit value, the first accumulated value being obtained by accumulating an acceleration difference between the limit acceleration and a current acceleration in cycles;
    correct the pre-correction upper limit value based on a maximum drive force of a drive force generation apparatus and the current acceleration to calculate a second upper limit value;
    (i) select the smaller of the demand value and the second upper limit value when the first upper limit value exceeds a predetermined threshold corresponding to the maximum drive force, and (ii) select the smaller of the demand value and the first upper limit value when the first upper limit value does not exceed the predetermined threshold; and
    control the drive force generation apparatus to generate the drive force corresponding to the selected value.

2. The vehicle speed limit apparatus of claim 1, wherein the processor adds a correction value to the pre-correction upper limit value to calculate the second upper limit value, and
    the processor calculates the correction value based on a second accumulated value, the second accumulated value being obtained by accumulating an acceleration difference between a maximum acceleration and the current acceleration in cycles, the maximum acceleration being determined based on the maximum drive force under a current travel situation.

3. The vehicle speed limit apparatus of claim 2, wherein the processor calculates, based on the maximum drive force, a travel resistance, a vehicle weight, and the correction value at a previous cycle, the maximum acceleration in cycles to calculate the correction value in cycles during a period in which the first upper limit value exceeds the predetermined threshold.

4. The vehicle speed limit apparatus of claim 1, wherein the processor adds a correction value to the pre-correction upper limit value to calculate the second upper limit value, and
    the processor calculates the correction value based on a second accumulated value, the second accumulated value being obtained by accumulating an acceleration difference between (a) the smaller of a maximum acceleration and the limit acceleration and (b) the current acceleration in cycles, the maximum acceleration being determined based on the maximum drive force under a current travel situation.

* * * * *